(12) United States Patent
Hsiao et al.

(10) Patent No.: US 9,003,435 B2
(45) Date of Patent: Apr. 7, 2015

(54) METHOD OF RECOMMENDING MEDIA CONTENT AND MEDIA PLAYING SYSTEM THEREOF

(71) Applicant: Wistron Corporation, New Taipei (TW)

(72) Inventors: Hsi-Chun Hsiao, New Taipei (TW); Shou-Te Wei, New Taipei (TW); Hsun-Chih Tsao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/047,034

(22) Filed: Oct. 7, 2013

(65) Prior Publication Data

US 2014/0215504 A1 Jul. 31, 2014

(30) Foreign Application Priority Data

Jan. 25, 2013 (TW) .............................. 102102930 U

(51) Int. Cl.
| | |
|---|---|
| H04N 7/16 | (2011.01) |
| H04H 60/33 | (2008.01) |
| H04N 21/466 | (2011.01) |
| H04N 21/441 | (2011.01) |
| H04N 21/45 | (2011.01) |
| H04N 21/442 | (2011.01) |

(52) U.S. Cl.
CPC ......... *H04N 21/4668* (2013.01); *H04N 21/441* (2013.01); *H04N 21/4532* (2013.01); *H04N 21/44218* (2013.01); *H04N 21/4661* (2013.01)

(58) Field of Classification Search
USPC ........... 725/10, 11, 12, 14, 29, 30, 40, 43, 44, 725/46, 47, 52, 93, 115, 133, 141, 153; 715/745, 781, 721; 348/51, 171, 348/207.99, 222.1, 231.3, 333.02, 333.12, 348/739; 382/103, 115, 117, 118, 119, 120, 382/189, 214, 305
See application file for complete search history.

(56) References Cited

U.S. PATENT DOCUMENTS

| | | | | |
|---|---|---|---|---|
| 7,757,172 | B2 * | 7/2010 | Yokoi ............................ | 715/721 |
| 7,822,233 | B2 * | 10/2010 | Nagaoka et al. ............... | 382/118 |
| 8,090,149 | B2 * | 1/2012 | Tsai .............................. | 382/103 |
| 8,139,136 | B2 * | 3/2012 | Iwamoto ................... | 348/333.02 |
| 8,595,642 | B1 * | 11/2013 | Lagassey ...................... | 715/781 |
| 2003/0061206 | A1 * | 3/2003 | Qian ................................ | 707/3 |
| 2003/0237093 | A1 * | 12/2003 | Marsh ............................ | 725/46 |
| 2004/0174438 | A1 * | 9/2004 | Jung .......................... | 348/222.1 |
| 2004/0194150 | A1 * | 9/2004 | Banker ......................... | 725/135 |
| 2008/0279425 | A1 * | 11/2008 | Tang .............................. | 382/118 |
| 2008/0316372 | A1 * | 12/2008 | Xu et al. ....................... | 348/739 |
| 2009/0055923 | A1 * | 2/2009 | Huang et al. .................... | 726/18 |
| 2009/0316016 | A1 * | 12/2009 | Iwamoto .................... | 348/222.1 |
| 2010/0153411 | A1 * | 6/2010 | Toebes et al. ................. | 707/758 |
| 2011/0153638 | A1 * | 6/2011 | McLean ....................... | 707/769 |
| 2011/0221911 | A1 * | 9/2011 | Kang ....................... | 348/207.99 |
| 2012/0054634 | A1 * | 3/2012 | Stone et al. ................... | 715/745 |
| 2012/0056898 | A1 * | 3/2012 | Tsurumi et al. .............. | 345/633 |

(Continued)

*Primary Examiner* — Jefferey Harold
*Assistant Examiner* — Mustafizur Rahman
(74) *Attorney, Agent, or Firm* — Winston Hsu; Scott Margo

(57) ABSTRACT

A method of recommending media content for a media playing system includes identifying a user in a viewing area; determining whether personal information of the user is stored in a database; and generating information related to a first media content recommendation according to the personal information when the personal information of the user is stored in the database.

29 Claims, 6 Drawing Sheets

(56) References Cited

U.S. PATENT DOCUMENTS

2012/0057794 A1* 3/2012 Tsurumi et al. ............... 382/195
2012/0174143 A1 7/2012 Yang
2012/0174162 A1* 7/2012 Roberts et al. ................. 725/52
2012/0210126 A1* 8/2012 Johnson et al. ............... 713/165
2012/0262555 A1* 10/2012 Chien et al. ..................... 348/51

* cited by examiner

METHOD OF RECOMMENDING MEDIA CONTENT AND MEDIA PLAYING SYSTEM THEREOF

BACKGROUND OF THE INVENTION

1. Field of the Invention

The present invention relates to a method of recommending media content in a media playing system and a media playing system thereof, and more particularly, to a method of recommending media content capable of performing recommendations based on preferences of multiple users in a media playing system for multiple users, and the media playing system thereof.

2. Description of the Prior Art

Conventional media recommendation systems with face identifying functions can read or display user data such as a user's browsing history, music playing list and utilizing habit once the user is identified. This kind of media recommendation system is utilized in an electronic device for an individual user, such as a tablet, smart phone, laptop, personal digital assistant (PDA), etc. The system allows a single user to log in and then reads or displays data of the user.

The conventional media recommendation systems for an individual user may not comply with simultaneous multiple user preferences, however, when applied in an electronic device which has multiple users in common. Other selecting methods should be applied. For example, the system may select a user having a maximum utilizing frequency and perform media content recommendations according to this user's preference information. In such a situation, other user's preference information will not be considered.

In recent years, digital televisions have become popular. Digital televisions are commonly watched by multiple users simultaneously; therefore, the conventional media recommendation system is not able to obtain a proper recommendation result. Thus, there is a need for improvement over the prior art.

SUMMARY OF THE INVENTION

It is therefore an objective of the present invention to provide a method of recommending media content and a media playing system thereof capable of performing recommendations based on preferences of multiple users in a media playing system which is utilized by the multiple users simultaneously.

The present invention discloses a method of recommending media content for a media playing system. The method comprises identifying a user in a viewing area; determining whether personal information of the user is stored in a database; and generating information related to a first media content recommendation according to the personal information when the personal information of the user is stored in the database.

The present invention further discloses a method of recommending media content for a media playing system. The method comprises identifying a plurality of users in a viewing area, in order to generate an identifying result; dividing the plurality of users into a first group and a second group according to the identifying result, wherein personal information of each user in the first group is stored in a database, and personal information of each user in the second group is not stored in the database; and generating information related to a first media content recommendation according to the personal information of each user in the first group.

The present invention further discloses a media playing system, for executing a method of recommending media content. The media playing system comprises a database; a sensing device, for identifying a user in a viewing area; and a processing unit, for determining whether personal information of the user is stored in the database, and generating information related to a first media content recommendation according to the personal information when the personal information of the user is stored in the database.

The present invention further discloses a media playing system, for executing a method of recommending media content. The media playing system comprises a database; a sensing device, for identifying a plurality of users in a viewing area, in order to generate an identifying result; and a processing unit, for dividing the plurality of users into a first group and a second group according to the identifying result, and generating information related to a first media content recommendation according to personal information of each user in the first group; wherein the personal information of each user in the first group is stored in the database, and personal information of each user in the second group is not stored in the database.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
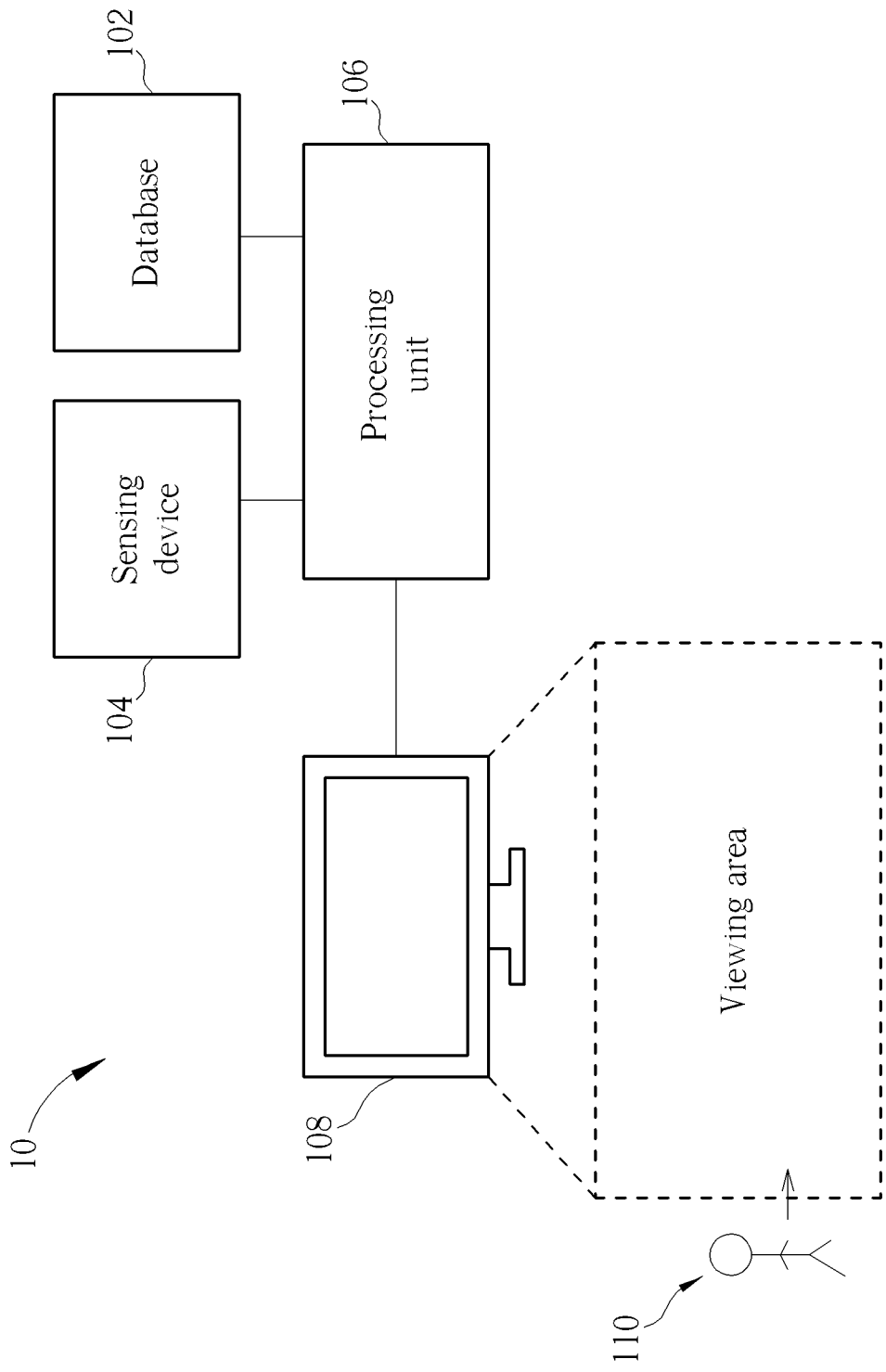
FIG. 1 is a schematic diagram of a media playing system according to an embodiment of the present invention.

Please refer to FIG. 1, which is a schematic diagram of a media playing system 10 according to an embodiment of the present invention. As shown in FIG. 1, the media playing system 10 includes a database 102, a sensing device 104, a processing unit 106 and a displaying device 108. The database 102 is utilized for storing personal information of a user, where the personal information includes preference information for media content of the user and facial information for identifying the user. The personal information of the user who has registered in the media playing system 10 or who has utilized the media playing system 10 is stored in the database 102. The sensing device 104 is utilized for identifying the user in the viewing area of the media playing system 10. When the media playing system 10 is in operation, the sensing device 104 may keep detecting the viewing area, in order to determine whether there is a user entering the viewing area or leaving the viewing area. After the sensing device 104 determines that a user 110 enters the viewing area, the processing unit 106 may determine whether personal information of the user 110 is stored in the database 102. The processing unit 106 further performs various follow-up operations according to whether the personal information of the user 110 is stored in the database 102.

In detail, when the processing unit 106 determines that the personal information of the user 110 is stored in the database 102, the processing unit 106 may generate information related to media content recommendation according to the personal information of the user 110; when the processing unit 106 determines that the personal information of the user 110 is not stored in the database 102, the processing unit 106 may generate information related to media content recommendation according to a universal feature of the user 110 and information related to the universal feature. The display device 108 is utilized for displaying the information related to the media content recommendation generated by the processing unit 106, in order to provide for the users in the viewing area. For example, the display device 108 may show the information related to the media content recommendation by utilizing a playing list. In some embodiments, the media playing system 10 may directly play a media file according to the information related to the media content recommendation.

Figure 2:
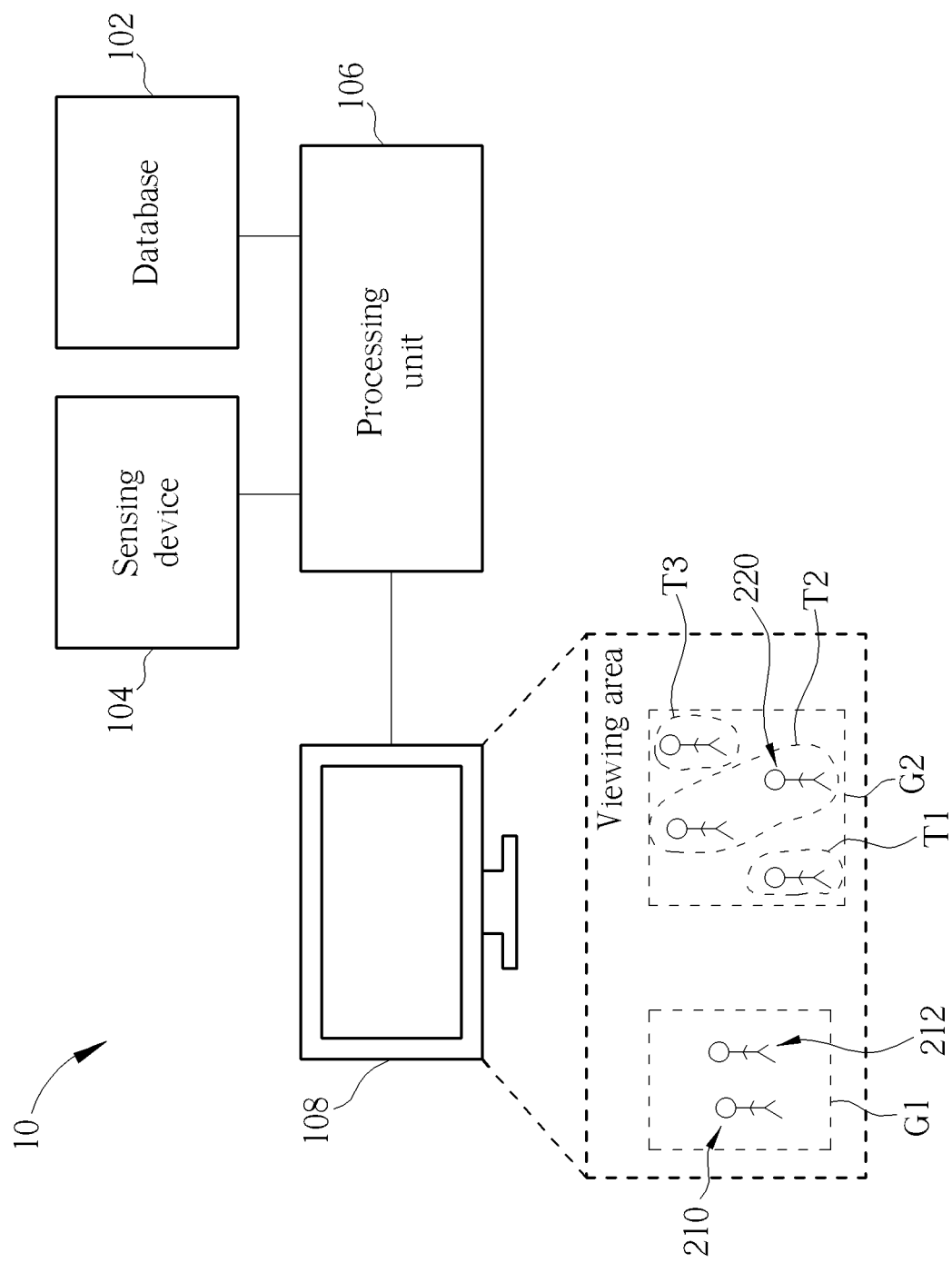
FIG. 2 is a schematic diagram of operations of the media playing system.

According to various methods of generating the information related to the media content recommendation, the media playing system 10 may perform different recommendations according to different attributes of the user. For example, there may be one or more users in the viewing area of the media playing system 10. Among these users, there may be several users who have been registered in the media playing system 10; hence their personal information is stored in the database 102, such that media content recommendation can be performed according to the content of the personal information. For other users not registered in the media playing system 10, their personal information is not stored in the database 102, and therefore media content recommendation is performed by utilizing universal features and information related to the universal features. Please refer to FIG. 2, which is a schematic diagram of operations of the media playing system 10. As shown in FIG. 2, when the media playing system 10 is turned on, the processing unit 106 first classifies the users utilizing the media playing system 10 (i.e. the users located in the viewing area of the media playing system 10), where the classifying method may be based on whether the personal information of the users is stored in the database 102. As shown in FIG. 2, if the personal information of the user is stored in the database 102, this user is classified into a group G1; if the personal information of the user is not stored in the database 102, this user is classified into a group G2. Therefore, all of the users located in the viewing area may be classified into one of the groups G1 and G2.

The personal information stored in the database 102 includes appearances of the user; hence the sensing device 104 may determine whether the personal information of each user in the viewing area is stored in the database 102 through a face detecting method, in order to classify the user. The sensing device 104 may determine a facial feature of each user, and compare this facial feature with all facial features among the personal information of the users stored in the database 102. The sensing device 104 then determines whether the personal information of the user is stored in the database 102 according to the comparing result. One of the comparing methods is to determine whether a degree of similarity between the facial features of the user in the viewing area and the facial features stored in the database 102 is greater than a predefined value. If the comparing result shows that the degree of similarity between the facial features of a user 210 and the facial features of a user stored in the database 102 is greater than the predefined value, the processing unit 106 may determine that the personal information of the user 210 is stored in the database 102, and the user 210 should be classified into the group G1. At this moment, a user in the database 102 who has the facial features with a degree of maximum similarity to the facial features of the user 210 can be considered as the user 210. If a degree of similarity between the facial features of a user 220 and the facial features of each user in the database 102 is less than the predefined value, the processing unit 106 may determine that the personal information of the user 220 is not stored in the database 102, and the user 220 should be classified into the group G2.

The processing unit 106 then performs media content recommendation according to information of the users in the groups G1 and G2, respectively. In the group G1, the personal information of the users is stored in the database 102; hence preference information related to media content among the personal information of the users can be obtained. The preference information stored in the database 102 may include the media files which have been played by the user, and playing time and date of the user. The processing unit 106 may perform media content recommendation according to this preference information. In some embodiments, there is only one user 210 in the group G1. Therefore, the processing unit 106 can perform media content recommendation directly after obtaining the preference information of the user 210.

In some embodiments, there are multiple users in the group G1; hence the processing unit 106 has to perform media content recommendation based on personal preferences of multiple users. Take an example of two users 210 and 212 in the group G1. The processing unit 106 first determines whether there is any media file which has been played by the users 210 and 212 simultaneously; that is, it is determined whether there is any media file played by the users 210 and 212 at the same time and date according to the personal information of the users 210 and 212 stored in the database 102. If yes, the processing unit 106 generates the information related to the media content recommendation according to the media files which have been played by the users 210 and 212 simultaneously. For example, the media files which have been played by the users 210 and 212 simultaneously may be music of some specific type (such as rock, blues, popular music, etc.) or songs sung by a specific singer, such that the generated information related to the media content recommendation may mainly be related to music of the specific type or songs sung by the specific singer. The operations of performing media content recommendation based on more than three users may also be performed in this way. For example, when there are three users in the group G1, the media files which have been played by these three users simultaneously may be found first, and are given a highest weight. The processing unit 106 then finds the media files which have been played by any two of these three users simultaneously, and gives a weight second to the highest weight for these media files. The processing unit 106 may rank the media files according to the weight, in order to display the recommendation in the display device 108. As a result, the media content recommendation can comply with preference of multiple users simultaneously.

In the above embodiment, sometimes there may be no media file which has been played by the users 210 and 212 simultaneously. In this situation, the processing unit 106 may further determine whether there is any media file which has been played by the users 210 and 212 in common; that is, to determine whether there is any media file played by the users 210 and 212 at different times or dates according to the personal information of the users 210 and 212 stored in the database 102. If yes, the processing unit 106 generates the information related to the media content recommendation according to the media files which have been played by the users 210 and 212 in common. For example, the media files which have been played by the users 210 and 212 in common may always be music of some specific type (such as rock, blues, popular music, etc.) or songs sung by a specific singer, such that the generated information related to the media content recommendation may mainly be related to music of the specific type or songs sung by the specific singer. The operations of performing media content recommendation based on more than three users may also be performed in this way. For example, when there are three users in the group G1, the media files which have been played by these three users in common may be found first, and are given a highest weight. The processing unit 106 then finds the media files which have been played by any two of these three users in common, and gives a weight second to the highest weight for these media files. The processing unit 106 may rank the media files according to the weight, in order to display the recommendation in the display device 108. As a result, the media content recommendation can comply with preference of multiple users simultaneously.

In the above embodiment, sometimes there may still be no media file which has been played by the users 210 and 212 in common. In this situation, the processing unit 106 may further determine a utilizing priority of the users 210 and 212. The processing unit 106 may perform the media content recommendation according to the media files which have been played by the users 210 and 212, respectively. The media file related to file content which has been played by the user with a higher priority has a higher weight, and the media file related to file content which has been played by the user with a lower priority has a lower weight. For example, if the utilizing priority of the user 210 is higher than that of the user 212, the processing unit 106 first generates the information related to the media content recommendation according to the media content which has been played by the user 210, and then generates the information related to the media content recommendation according to the media content which has been played by the user 212, where the weight given to the former is higher than the weight given to the latter. In some embodiments, the processing unit 106 may only generate the information related to the media content recommendation of the user having the highest priority, or the processing unit 106 may generate the information related to the media content recommendation of some users having higher priority, and give different weights to each media file in the information related to the media content recommendation according to different utilizing priorities of these users, in order to display the media files with the highest weight. As a result, the media content recommendation can comply with preferences of multiple users simultaneously.

The utilizing priority for different users can be determined in any manner. For example, it may be determined according to a time of the user utilizing the media playing system 10. During a period of time in the past, if a time of the user 210 utilizing the media playing system 10 is longer than a time of the user 212 utilizing the media playing system 10, a higher utilizing priority may be provided for the user 210. In another example, the utilizing priority may be determined according to a number of times or a frequency of the user playing media files. During a period of time in the past, if a number of files played by the user 210 in the media playing system 10 is more than a number of files played by the user 212 or a playing frequency of the user 210 is higher than that of the user 212, a higher utilizing priority is provided for the user 210.

In summary, for the users in the group G1, the processing unit 106 first determines whether there is only one user or whether there is a plurality of users in the group G1. When there is only one user in the group G1, the processing unit 106 generates the information related to the media content recommendation according to the preference information among the personal information of the only one user. When there is a plurality of users in the group G1, the processing unit 106 further determines whether there is any media file which has been played by the plurality of users simultaneously. When there is a media file which has been played by the plurality of users simultaneously, the processing unit 106 generates the information related to the media content recommendation according to this media file which has been played by the plurality of users simultaneously. When there is no media file which has been played by the plurality of users simultaneously, the processing unit 106 further determines whether there is a media file which has been played by the plurality of the users in common. When there is a media file which has been played by the plurality of users in common, the processing unit 106 generates the information related to the media content recommendation according to this media file which has been played by the plurality of users in common. When there is no media file which has been played by the plurality of users in common, the processing unit 106 further determines the utilizing priority of the plurality of users, and gives a higher weight to the file which has been played by the user having the higher utilizing priority. The processing unit 106 then generates the information related to the media content recommendation according to the weight.

In the viewing area of the media playing system 10, there may be several users classified into the group G2 since their personal information is not stored in the database 102. For the users in the group G2, the processing unit 106 in the embodiments of the present invention may also generate the information related to the media content recommendation according to universal features of the users and related feature information. As a result, the media content recommendation can not only comply with the preference of the users who has been registered in the database 102, but also comply with the preference of most users among those who have not been registered in the database 102.

In detail, the processing unit 106 may first classify the users in the group G2 into a plurality of user types according to the universal features. According to the classification result, the processing unit 106 obtains the specific user type among the plurality of user types having the most number of users. The above universal features may include a user's appearances such as ethnicity, gender, and age, etc. Therefore, the corresponding user type may be a combination of different ethnicities, genders and ages. For example, for the ethnicity, the users may be classified into East Asian, South Asian, black and white; for the gender, the users may be classified into men and women; for the age, the users may substantially be classified into elders, adults and children. The sensing device 104 possesses functions of identifying facial features of people; hence each user may be classified according to the degree of similarity between the appearances of the user and the universal feature corresponding to each of the user types. As a result, according to the above classification, all of the users can be classified into 3*2*4=24 user types. After the classification is accomplished, the processing unit 106 may obtain the specific user type having the most number of users according to the classification result, in order to generate the information related to the media content recommendation according to specific feature information corresponding to this specific user type. Taking the group G2 shown in FIG. 2 as an example, if all users in the group G2 are classified into three user types T1-T3, where the user type T2 includes two users and each of the user types T1 and T3 only includes one user, the processing unit 106 performs the media content recommendation according to the feature information of the user type T2.

The above feature information of the user type T2 means the information corresponding to the universal feature of the user type T2. For example, if the universal feature corresponding to the user type T2 is children, the processing unit 106 may recommend a children's ballad or a children's song, in order to comply with the preference of most children. The method of classifying the universal features and information related to each universal feature can be selected arbitrarily, which is not limited herein.

The information related to the universal feature may be built in the database 102 according to the above universal preference information which is defined generally based on the universal features of people; in addition, this information may also be obtained from history information of the media playing system 10. For example, the database 102 may be stored in a cloud server, and can be connected to multiple media playing systems. When each of the media playing systems is turned on, the system may be connected to the database 102 and user information (i.e. users of some user type always play media files having a certain feature information) may be uploaded to the database 102. The database 102 can obtain which media files in each user type are played by the users more frequently, in order to obtain the preference information of the users in each user type for the media content. As a result, although the personal information of the users in the group G2 is not stored in the database 102, the media playing system 10 can still perform the media content recommendation based on the preference of most users according to the user type to which the user belongs, in order to generate information related to the media content recommendation.

According to the above method of generating the information related to the media content recommendation based on the users in the group G1 and the group G2, the media playing system 10 can generate two recommendation lists of media content. One of the recommendation lists is generated for the users who have been registered in the media playing system 10, and the other is generated for those who have not been registered in the media playing system 10. In some embodiments, the display device 108 may display these two recommendation lists of media content, respectively, in order to allow the user to select which media content to be played. In other embodiments, these two lists may be combined to one, in order to list media files in the recommendation list in an order of specific weight. For example, the weight of the group G1 may be set higher than that of the group G2, or the weight may be determined according to the number of users in the group G1 and in the group G2, e.g. the weight is defined based on a ratio of the number of users in the group G1 to the number of users in the group G2. After the calculation of weight is performed on the combined list, a mixed recommendation list of media content is generated. In some embodiments, there may be a same media file in both the recommendation lists of media content generated based on the group G1 and the group G2. At this moment, the same media file can be given a higher weight, and is displayed in the recommendation list with a higher priority. The information related to the media content recommendation or the recommendation list of media content narrated in the above embodiments may be displayed in the display device 108, or the media playing system 10 may play the media files according to the information related to the media content recommendation directly.

Figure 3:
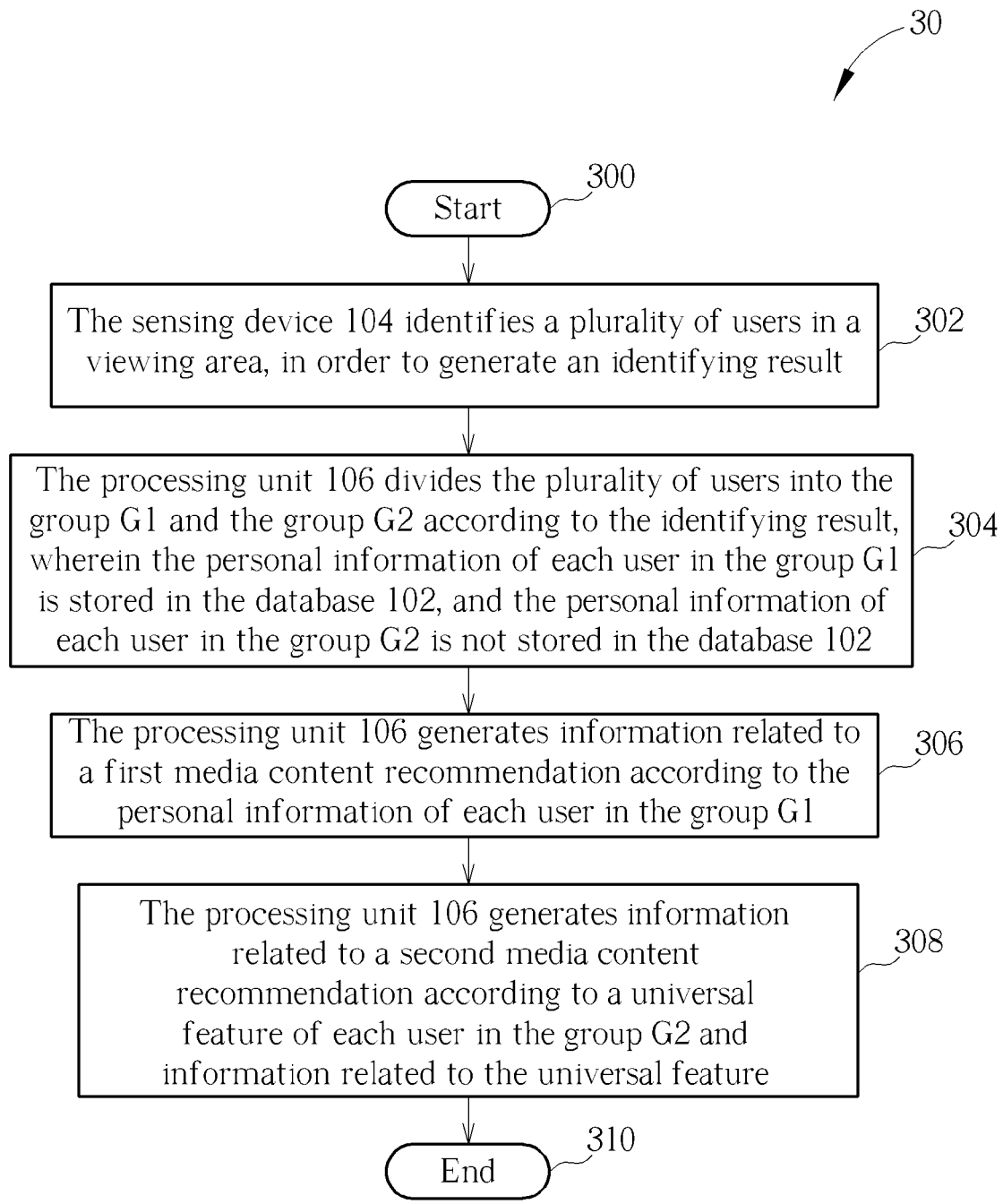
FIG. 3 is a schematic diagram of a media content recommending process according to an embodiment of the present invention.

The above method of recommending media content can be summarized into a media content recommending process 30, as shown in FIG. 3. The media content recommending process 30 includes the following steps:

Step 300: Start.

Step 302: The sensing device 104 identifies a plurality of users in a viewing area, in order to generate an identifying result.

Step 304: The processing unit 106 divides the plurality of users into the group G1 and the group G2 according to the identifying result, wherein the personal information of each user in the group G1 is stored in the database 102, and the personal information of each user in the group G2 is not stored in the database 102.

Step 306: The processing unit 106 generates information related to a first media content recommendation according to the personal information of each user in the group G1.

Step 308: The processing unit 106 generates information related to a second media content recommendation according to a universal feature of each user in the group G2 and information related to the universal feature.

Step 310: End.

Figure 4:
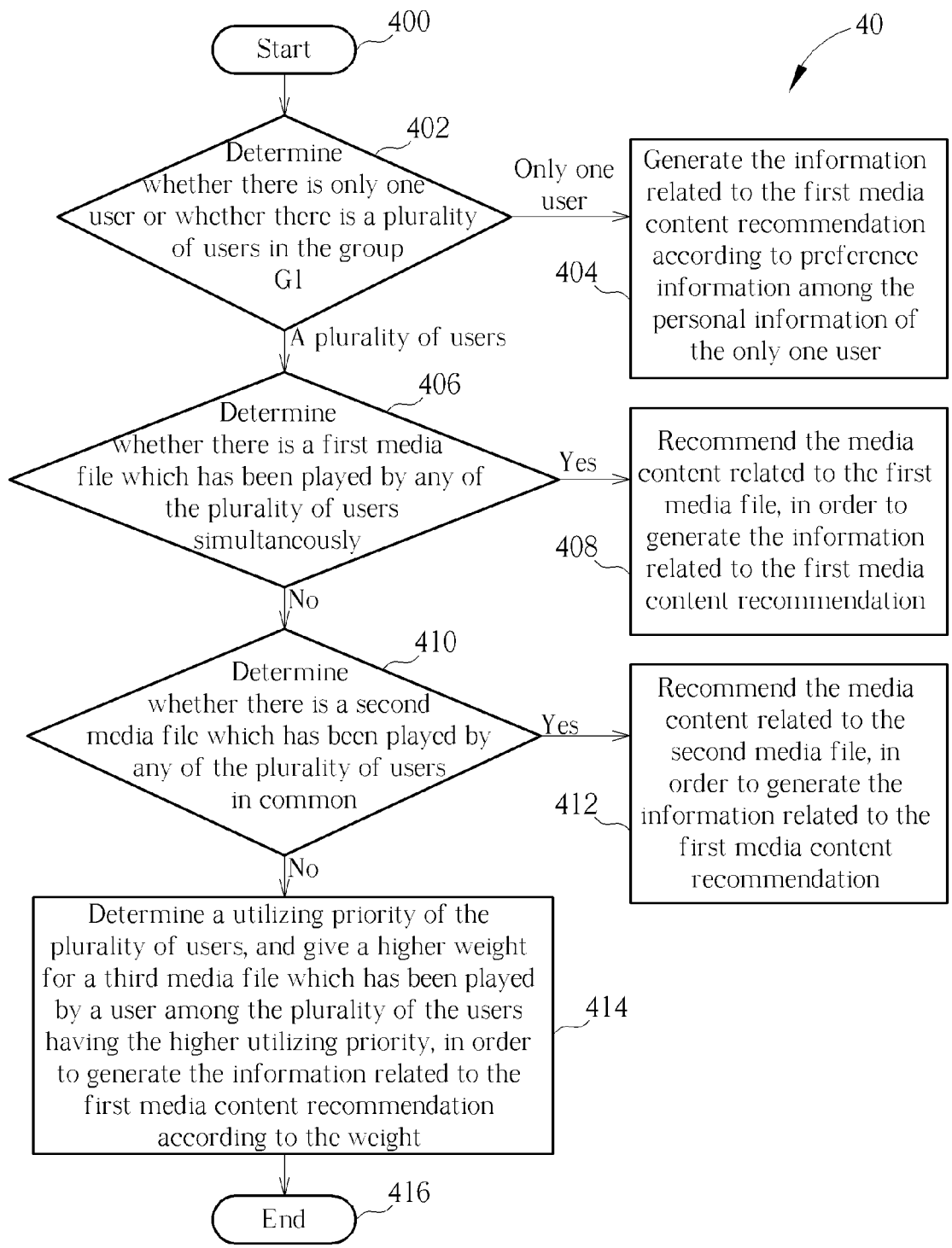
FIG. 4 is a schematic diagram of a media content recommending process corresponding to the user whose personal information is stored in the database according to an embodiment of the present invention.

In the media content recommending process 30, Step 306 is executed by the processing unit 106, and describes a method of recommending the media content corresponding to the group G1 (the user whose personal information is stored in the database 102). As shown in FIG. 4, Step 306 can further be divided into the following steps:

Step 400: Start.

Step 402: Determine whether there is only one user or whether there is a plurality of users in the group G1. If there is only one user in the group G1, go to Step 404; if there is a plurality of users in the group G1, go to Step 406.

Step 404: Generate the information related to the first media content recommendation according to preference information among the personal information of the only one user.

Step 406: Determine whether there is a first media file which has been played by any of the plurality of users simultaneously. If yes, go to Step 408; otherwise, go to Step 410.

Step 408: Recommend the media content related to the first media file, in order to generate the information related to the first media content recommendation.

Step 410: Determine whether there is a second media file which has been played by any of the plurality of users in common. If yes, go to Step 412; otherwise, go to Step 414.

Step 412: Recommend the media content related to the second media file, in order to generate the information related to the first media content recommendation.

Step 414: Determine a utilizing priority of the plurality of users, and give a higher weight for a third media file which has been played by a user among the plurality of the users having the higher utilizing priority, in order to generate the information related to the first media content recommendation according to the weight.

Step 416: End.

Figure 5:
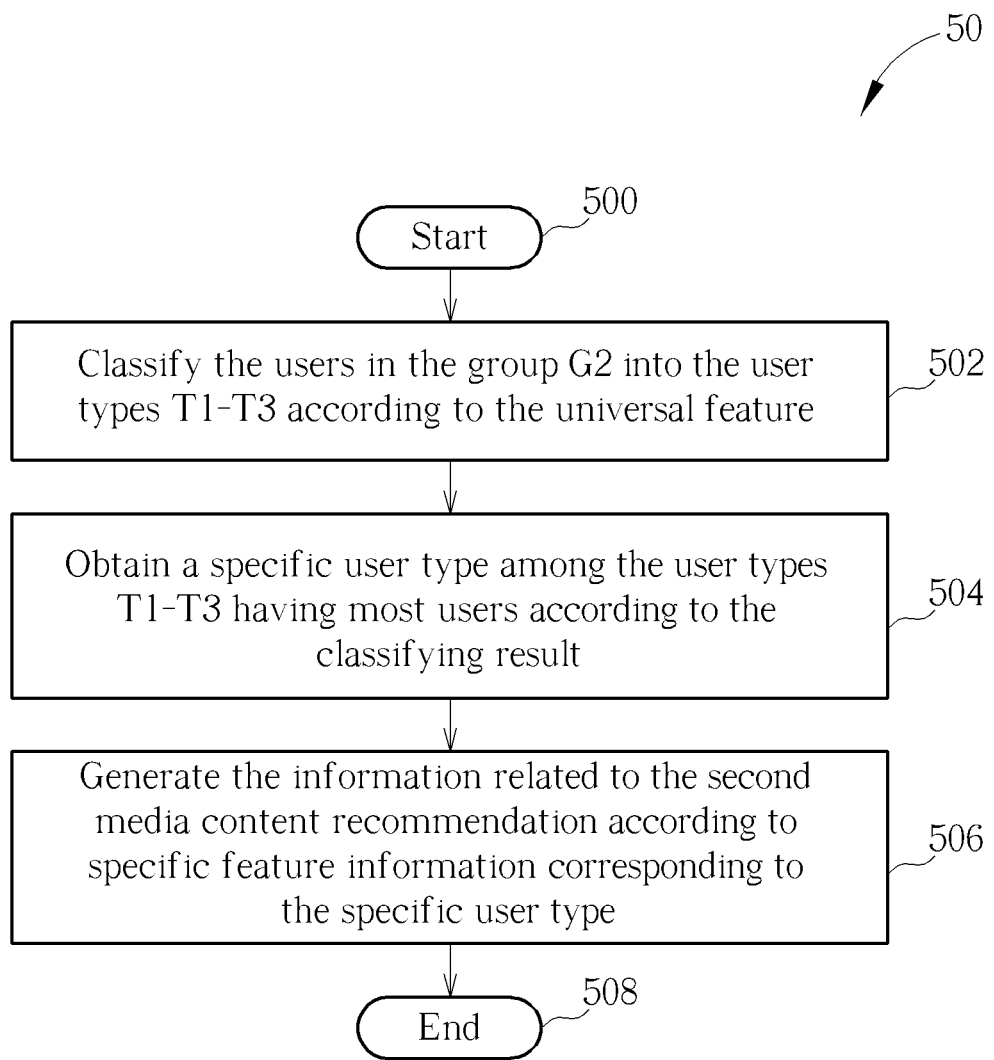
FIG. 5 is a schematic diagram of a media content recommending process corresponding to the user whose personal information is not stored in the database according to an embodiment of the present invention.

In the media content recommending process, Step 308 is executed by the processing unit 106, and describes a method of recommending the media content corresponding to the group G2 (the user whose personal information is not stored in the database 102). As shown in FIG. 5, Step 308 can further be divided into the following steps:

Step 500: Start.

Step 502: Classify the users in the group G2 into the user types T1-T3 according to the universal feature.

Step 504: Obtain a specific user type among the user types T1-T3 having most users according to the classifying result.

Step 506: Generate the information related to the second media content recommendation according to specific feature information corresponding to the specific user type.

Step 508: End.

Please note that, in order to obtain real-time information related to the media content recommendation, when the media playing system 10 is turned on, the sensing device 104 may detect a variation of the user status in the viewing area. For example, when a television is in use, it rarely occurs that all of the users sit in front of the television from the time the television is turned on to the time the television is turned off. Under most circumstances, during the period from the television being turned on to being turned off, there are users entering and leaving the viewing area continuously. Therefore, if the complete media content information needs to be obtained, the sensing device 104 has to continue detecting, such that when a new user enters the viewing area, the processing unit 106 can immediately determine whether information of this user is stored in the database 102, in order to divide this user into the group G1 or the group G2. The follow-up step of media content recommendation will then be performed, and the information related to the media content recommendation can be obtained. When a user leaves the viewing area, the processing unit 106 may determine whether the leaving user belongs to the group G1 or the group G2. The processing unit 106 further recalculates the weight of the recommended media files corresponding to the group G1 or the group G2, in order to obtain the latest information related to the media content recommendation. The operations related to the media playing system 10 after a new user enters or an original user leaves the viewing area is detailed above, and will not be narrated herein.

Figure 6:
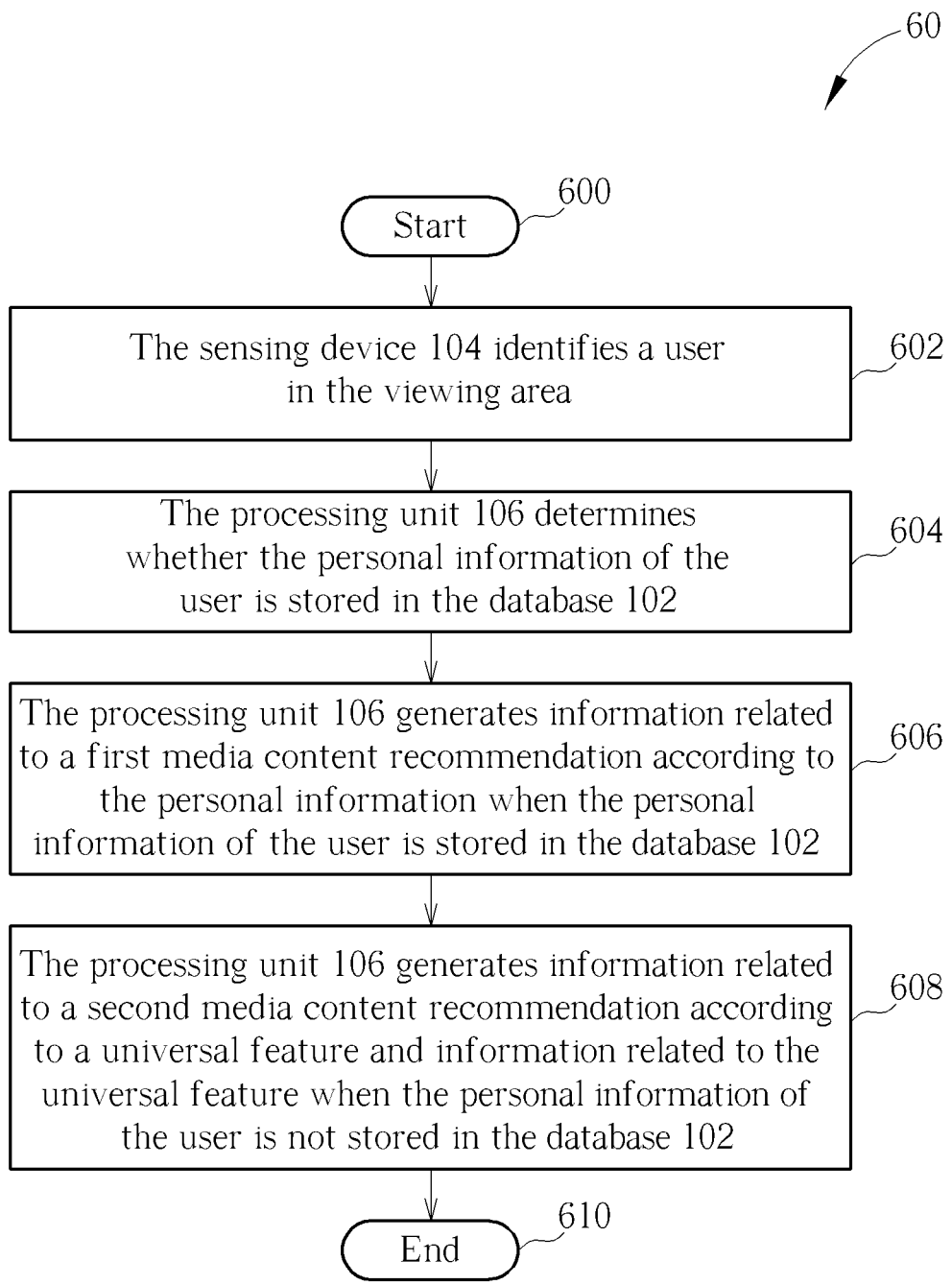
FIG. 6 is a schematic diagram of another media content recommending process according to an embodiment of the present invention.

The above method related to media content recommendation for a new user entering the viewing area can be summarized into another media content recommending process 60, as shown in FIG. 6. The media content recommending process 60 includes the following steps:

Step 600: Start.

Step 602: The sensing device 104 identifies a user in the viewing area.

Step 604: The processing unit 106 determines whether the personal information of the user is stored in the database 102.

Step 606: The processing unit 106 generates information related to a first media content recommendation according to the personal information when the personal information of the user is stored in the database 102.

Step 608: The processing unit 106 generates information related to a second media content recommendation according to a universal feature and information related to the universal feature when the personal information of the user is not stored in the database 102.

Step 610: End.

Please note that the spirit of the present invention is to perform recommendations based on the preference of multiple users; hence the method disclosed in the embodiments of the present invention can be applied in the media playing system for multiple users. Those skilled in the art can make modifications and alterations accordingly. For example, the above method of classifying the users in the group G2 according to the universal feature is only one embodiment. In other embodiments, the users in the group G2 may also be classified in other ways, in order to generate other user types. The feature information corresponding to each user type may be different since the history data stored in the database 102 is different. Moreover, in the above embodiments, all arrangements of the weights related to the media files and the utilizing priority of the users can be performed in a proper manner according to system requirements, and are not limited to the method described in the above embodiments.

In the prior art, the conventional media recommendation systems may not comply with preferences of multiple users when applied in an electronic device with simultaneous multiple users. In such a situation, the media recommendation system can only consider the preference information of one of the users, and other user's preference information will not be considered. In comparison, the present invention provides a method of recommending media content, and is capable of performing media content recommendations based on the preferences of multiple users in a media playing system which is utilized by multiple users simultaneously.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of recommending media content for a media playing system, the method comprising:

identifying a user in a viewing area;

determining whether personal information of the user is stored in a database; and generating information related to a first media content recommendation according to the personal information when the personal information of the user is stored in the database;

wherein the step of generating the information related to the first media content recommendation according to the personal information comprises:

determining whether there are any other users in the viewing area apart from the user who have personal information stored in the database;

when determining there is only the user in the viewing area having personal information stored in the database, generating the information related to the first media content recommendation according to preference information among the personal information of the user; and when determining there are other users in the viewing area having personal information stored in the database, further determining whether there is any related preference information between the personal information of the user and the personal information of the other users.

2. The method of claim 1, wherein the step of identifying the user in the viewing area is performed through a face detecting method.

3. The method of claim 1, wherein the step of determining whether the personal information of the user is stored in the database comprises:

determining whether a degree of similarity between a first facial feature of the user and a second facial feature among each personal information stored in the database is greater than a predefined value;

when determining that the degree of similarity between the first facial feature of the user and the second facial feature among any of the personal information stored in the database is greater than the predefined value, determining the personal information of the user is stored in the database, and determining the user is a user in the database who has the second facial feature with a maximum degree of similarity to the first facial feature; and when determining that the degree of similarity between the first facial feature of the user and the second facial feature among each of the personal information stored in the database is less than the predefined value, determining the personal information of the user is not stored in the database.

4. The method of claim 1, wherein the step of determining whether there is any related preference information between the personal information of the user and the personal information of the other users comprises:

determining whether there is a first media file which has been played by the user and the other users simultaneously;

when determining there is a first media file which has been played by the user and the other users simultaneously, recommending media content related to the first media file, in order to generate the information related to the first media content recommendation; and when determining there is no first media file which has been played by the user and the other users simultaneously, further determining whether there is a second media file which has been played by both the user and the other users.

5. The method of claim 4, wherein the step of determining whether there is a second media file which has been played by both the user and the other users comprises:

when determining there is a second media file which has been played by both the user and the other users, recommending media content related to the second media file, in order to generate the information related to the first media content recommendation; and when determining there is no second media file which has been played by both the user and the other users, further determining a utilizing priority of all users, and giving a higher weight to a third media file which has been played by a user who has a higher utilizing priority, in order to generate the information related to the first media content recommendation according to the weight.

6. The method of claim 5, wherein the step of determining the utilizing priority of all users comprises determining the utilizing priority of all users according to a time of each user utilizing the media playing system.

7. The method of claim 5, wherein the step of determining the utilizing priority of all users comprises determining the utilizing priority of all users according to a number of times or a frequency of each user playing media files in the media playing system.

8. The method of claim 1, wherein when the personal information of the user is not stored in the database, generating information related to a second media content recommendation according to a universal feature and information related to the universal feature.

9. The method of claim 8, wherein the step of generating the information related to the second media content recommendation according to the universal feature and the information related to the universal feature comprises:

classifying users in the viewing area whose personal information is not stored in the database into a plurality of user types according to the universal feature;

obtaining a specific user type among the plurality of user types having most users according to a classification result; and generating the information related to the second media content recommendation according to specific feature information corresponding to the specific user type.

10. The method of claim 9, wherein the universal feature comprises an ethnicity, a gender and an age of the user, and the plurality of user types comprises a combination of different ethnicities, different genders and different ages.

11. The method of claim 9, wherein the step of generating the information related to the second media content recommendation according to the specific feature information corresponding to the specific user type comprises generating the information related to the second media content recommendation according to universal preference information of all users among the specific user type.

12. The method of claim 8, wherein when the information related to the first media content recommendation and the information related to the second media content recommendation have a same media file, giving a higher weight to the same media file.

13. The method of claim 1, further comprising playing a media file directly according to the information related to the first media content recommendation.

14. A method of recommending media content for a media playing system, the method comprising:

identifying a plurality of users in a viewing area, in order to generate an identifying result;

dividing the plurality of users into a first group and a second group according to the identifying result, wherein personal information of each user in the first group is stored in a database, and personal information of each user in the second group is not stored in the database; and generating information related to a first media content recommendation according to the personal information of each user in the first group.

15. The method of claim 14, wherein the step of identifying the plurality of users in the viewing area is performed through a face detecting method.

16. The method of claim 14, wherein the step of dividing the plurality of users into the first group and the second group according to the identifying result comprises:

determining whether a degree of similarity between a first facial feature of each user among the plurality of users and a second facial feature among each personal information stored in the database is greater than a predefined value;

when determining that the degree of similarity between the first facial feature of the user and the second facial feature among any of the personal information stored in the database is greater than the predefined value, dividing the user into the first group, and determining the user is a user in the database who has the second facial feature with a maximum degree of similarity to the first facial feature; and when determining that the degree of similarity between the first facial feature of the user and the second facial feature among each of the personal information stored in the database is less than the predefined value, dividing the user into the second group.

17. The method of claim 14, wherein the step of generating the information related to the first media content recommendation according to the personal information of each user in the first group comprises:

determining whether there is only one user or whether there is a plurality of users in the first group;

when determining there is only one user in the first group, generating the information related to the first media content recommendation according to preference information among the personal information of the only one user; and when determining there is a plurality of users in the first group, further determining whether there is any related preference information between the personal information of the plurality of users.

18. The method of claim 17, wherein the step of determining whether there is any related preference information between the personal information of the plurality of users comprises:
   determining whether there is a first media file which has been played by any of the plurality of users simultaneously;
   when determining there is a first media file which has been played by more than one of the plurality of users simultaneously, recommending media content related to the first media file, in order to generate the information related to the first media content recommendation; and
   when determining there is no first media file which has been played by more than one of the plurality of users simultaneously, further determining whether there is a second media file which has been played by any of the plurality of users in common.

19. The method of claim 18, wherein the step of determining whether there is a second media file which has been played by any of the plurality of users in common comprises:
   when determining there is a second media file which has been played by more than one of the plurality of users in common, recommending media content related to the second media file, in order to generate the information related to the first media content recommendation; and
   when determining there is no second media file which has been played by more than one of the plurality of users in common, further determining a utilizing priority of the plurality of users, and giving a higher weight to a third media file which has been played by a user who has a higher utilizing priority, in order to generate the information related to the first media content recommendation according to the weight.

20. The method of claim 19, wherein the step of determining the utilizing priority of the plurality of users comprises determining the utilizing priority of the plurality of users according to a time of each user utilizing the media playing system.

21. The method of claim 19, wherein the step of determining the utilizing priority of the plurality of users comprises determining the utilizing priority of the plurality of users according to a number of times or a frequency of each user playing media files in the media playing system.

22. The method of claim 14, further comprising generating information related to a second media content recommendation according to a universal feature of each user in the second group and information related to the universal feature.

23. The method of claim 22, wherein the step of generating the information related to the second media content recommendation according to the universal feature of each user in the second group and the information related to the universal feature comprises:
   classifying the users in the second group into a plurality of user types according to the universal feature;
   obtaining a specific user type among the plurality of user types having most users according to a classification result; and
   generating the information related to the second media content recommendation according to specific feature information corresponding to the specific user type.

24. The method of claim 22, wherein the universal feature comprises an ethnicity, a gender and an age of the user, and the plurality of user types comprises a combination of different ethnicities, different genders and different ages.

25. The method of claim 23, wherein the step of generating the information related to the second media content recommendation according to the specific feature information corresponding to the specific user type comprises generating the information related to the second media content recommendation according to universal preference information of all users among the specific user type.

26. The method of claim 22, wherein when the information related to the first media content recommendation and the information related to the second media content recommendation have a same media file, giving a higher weight to the same media file.

27. The method of claim 14, further comprising playing a media file directly according to the information related to the first media content recommendation.

28. A media playing system, for executing a method of recommending media content as stated in claim 1, the media playing system comprising:
   a database;
   a sensing device, for identifying a user in a viewing area; and
   a processing unit, for determining whether personal information of the user is stored in the database, and generating information related to a first media content recommendation according to the personal information when the personal information of the user is stored in the database.

29. A media playing system, for executing a method of recommending media content as stated in claim 14, the media playing system comprising:
   a database;
   a sensing device, for identifying a plurality of users in a viewing area, in order to generate an identifying result; and
   a processing unit, for dividing the plurality of users into a first group and a second group according to the identifying result, and generating information related to a first media content recommendation according to personal information of each user in the first group;
   wherein the personal information of each user in the first group is stored in the database, and personal information of each user in the second group is not stored in the database.

* * * * *